(12) United States Patent
Jenkins et al.

(10) Patent No.: US 8,417,811 B1
(45) Date of Patent: Apr. 9, 2013

(54) PREDICTING HARDWARE USAGE IN A COMPUTING SYSTEM

(75) Inventors: Jonathan A. Jenkins, Seattle, WA (US);
Timothy M. Sehn, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 462 days.

(21) Appl. No.: 12/640,331

(22) Filed: Dec. 17, 2009

(51) Int. Cl.
*G06F 13/00* (2006.01)
(52) U.S. Cl.
USPC .......................... 709/224; 709/230; 709/250
(58) Field of Classification Search ................. 709/223, 709/224, 226, 230, 250
See application file for complete search history.

(56) References Cited

U.S. PATENT DOCUMENTS

| | | | | |
|---|---|---|---|---|
| 7,143,222 | B2 * | 11/2006 | Fisher et al. .................. | 710/200 |
| 8,041,808 | B1 * | 10/2011 | Becker .......................... | 709/224 |
| 2002/0152305 | A1 * | 10/2002 | Jackson et al. ................ | 709/224 |
| 2005/0107997 | A1 * | 5/2005 | Watts et al. .................... | 703/21 |
| 2007/0213992 | A1 * | 9/2007 | Anderson et al. .............. | 705/1 |
| 2010/0185534 | A1 * | 7/2010 | Satyavolu et al. ............. | 705/30 |

* cited by examiner

*Primary Examiner* — Viet Vu
(74) *Attorney, Agent, or Firm* — Thomas Horstemeyer, LLP (57) ABSTRACT

Disclosed are various embodiments of modeling hardware usage in a computing system. Usage factors affecting hardware usage of the computing system are identified. Usage factor data over a time period that corresponds to the usage factors is extracted. A regression analysis is performed on the historical usage factor data that determines a hardware usage function characterizing a relationship between the usage factors and historical hardware usage data.

18 Claims, 6 Drawing Sheets

PREDICTING HARDWARE USAGE IN A COMPUTING SYSTEM

BACKGROUND

Computing systems may comprise fleets of computing devices, the fleets being of varying size. Accurately predicting future hardware usage can be important for accurately assessing future capital expenditures on hardware as well as ensuring the presence of adequate hardware resources for a computing system fleet.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to monitoring and analyzing hardware usage in order to generate a model for predicting future hardware usage and needs in a computing system. A computing system can include a content delivery system, a storage system, a data repository, etc. In one embodiment the computing system can implement a content delivery system, which can in turn facilitate an electronic commerce system, a search system, a publishing system, or other content systems or combinations as can be appreciated. A content delivery system may serve many millions of users located in disparate geographic locations. Alternatively, a content delivery system can also serve very small user bases.

In other embodiments, a computing system can implement a data repository that may or may not serve public traffic, and involves the storage and backup of data. As a non-limiting example, a data repository can include a system tasked with the storage and backup of financial data and/or financial transactions. In yet other embodiments, a computing system can include a cluster of computing devices configured to perform a large scale computational task. Other applications and implementations of computing systems should be appreciated.

Accordingly, scalability is a factor in the design and implementation of computing systems that may include one or more computing devices. In addition to designing a computing system that is scalable accurately predicting an amount of required hardware resources is also an important factor in the implementation of a computing system. In addition, differing applications or implementations of a computing system may generate varying levels of hardware usage. As a non-limiting example, in a content delivery system, user bases may generate differing levels of traffic generated by the users. Various content delivery systems may store and serve varying amounts of content, consume varying amounts of network bandwidth, etc. In the case of a computing system, for example, the amount of hardware resources required in such a content delivery system can be projected based upon various factors such as, but not limited to, an order or transaction rate, traffic rate, etc.

However, in the case of a content delivery system, under-projecting an amount of hardware resources may lead to a less than optimal user experience because of a lack of adequate computing resources to serve the user base. In the case of a data repository, a lack of adequate computing resources may lead to unacceptable transaction times, etc. On the other hand, over-projecting can lead to unnecessary capital spending on hardware resources that are not required for the proper functioning of the computing system. Particularly in the case of large-scale computing systems that serve many users or large-scale applications, such unnecessary spending can be quite costly if expected hardware resources are over-projected.

Accordingly, embodiments of the disclosure include a flexible and accurate model for projecting hardware usage of a computing system. A model can be generated that is tailored for any type of computing system by analyzing historical usage factors as well as historical hardware usage data in order to project future hardware usage. More specifically, in one embodiment, a regression analysis can be performed on historical data regarding various usage factors and combinations of usage factors in order to generate a hardware usage function that closely tracks historical hardware usage. If the hardware usage function yields an acceptably low variance relative to historical hardware usage, then the model can be adopted and employed to project future hardware usage, which can in turn be used to plan capital expenditures on hardware, computing and/or network resources.

In the case of an electronic commerce system implemented by a computing system, some prior art models for projecting hardware usage are based on rate factors, which can include factors such as transaction rate, order rate, hit rate, other metrics based at least upon operations per unit of time, etc. Rate factors can also be described as usage factors that are measures per unit of time. However, many models fail to adequately consider cumulative factors, which take into account how much data is stored in the computing system. Cumulative factors can also be described as absolute measures. In the case of an electronic commerce system, cumulative factors can include the number of products available in the system, the total number of users who have accounts in the system, media (e.g., images) storage, etc. As another non-limiting example, in the case of a music delivery system, cumulative factors can include the total number of songs available in the system.

In certain computing systems, such cumulative factors can be more dominant determiners of hardware usage than rate factors. In an electronic commerce system, a cumulative factor that may drive hardware usage is the total number of products available in the system. Products in an electronic commerce system can be associated with various product data, product reviews, imagery, video, etc. In addition, products have various dependencies on other data within the electronic commerce system. Accordingly, embodiments described herein can identify whether cumulative usage factors (e.g., total products in an electronic commerce system) more accurately predict future hardware usage than rate factors. Additionally, embodiments described herein can also determine if an accurate hardware usage function results from a combination of rate factors and cumulative factors that can be used as a model for predicting hardware usage.

Figure 1:
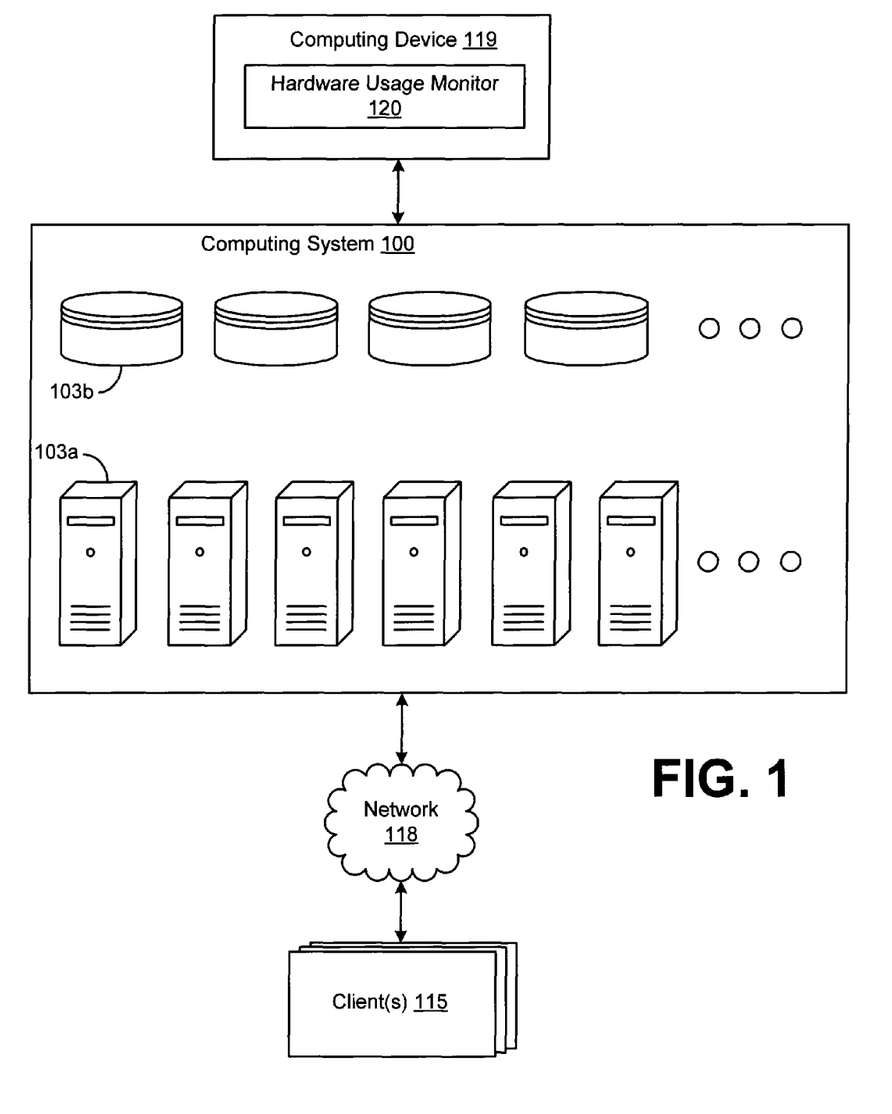
FIG. 1 is a drawing of a networked environment according to various embodiments of the present disclosure.

With reference to FIG. 1, shown is a networked environment according to various embodiments. The networked environment includes one or more computing devices 103 that implement a computing system 100. In some embodiments, the computing system 100 can facilitate a content delivery system, which can include an electronic commerce system, a search engine, a social networking system, a media delivery system, etc. As noted above, a computing system 100 can take other forms, and the example illustrated in FIG. 1 is but one example. In the depicted example, the computing devices 103 are in data communication with one or more clients 115 by way of a network 118. The network 118 includes, for example, the Internet, intranets, extranets, wide area networks (WANs), local area networks (LANs), wired networks, wireless networks, or other suitable networks, etc., or any combination of two or more such networks.

A computing system 100 can be configured such that computing devices 103 therein can perform specific tasks within the computing system 100. Computing devices 103 can include, as a non-limiting example, devices 103a that are configured to execute various applications such as, for example, a web server, and can receive and serve requests from clients 115 for content. Alternatively, some of the computing devices 103b can be configured as data stores or electronic repositories, which can store data that is served to clients 115 via an application server or web server application executed by other computing devices 103a in the computing system 100.

In the non-limiting example of an electronic commerce system implemented by the computing system 100, users, via a client 115, can request content from the computing system 100 regarding products available in the electronic commerce system, submit product orders, view order histories, account data, etc., and make other content requests that should be appreciated. In this case, a computing device 103a of the computing system 100 can receive and serve electronic commerce related requests from a client 115. A computing device 103b can therefore be configured as an electronic repository that can store and provide information relating to electronic commerce related content delivered to clients 115 by the computing system 100. To this end, a computing device 103b configured as an electronic repository can include data and applications operable to provide access to the data stored therein by computing devices 103a that are configured to serve content requests from clients 115.

In other embodiments, the computing devices 103 of the computing system 100 can implement web services and expose application programming interfaces to other computing devices via the network 118. In this way, the computing system 100 can provide computing infrastructure or computer resources to other computing devices via the network 118. To this end, the specific architecture of the computing system 100 can vary among various embodiments of the disclosure, and the depicted architecture shown in FIG. 1 is but one example. For example, in still other embodiments, computing devices 103 comprising a computing system 100 can be uniformly architected, such that all of the computing devices 103 implement the same functionality rather than being assigned specific tasks necessary to implement a particular type of computing system.

In order to serve a user base and appropriately handle a given application or set of applications, a computing system 100 should be provisioned with an appropriate fleet of computing devices 103 or hardware resources in order to sustain an acceptable quality of service. A computing device 103 in a computing system 100 may comprise, for example, a desktop computer, a server computer or like system. Computing devices 103 in the computing system 100 may include multiple computing devices 103 arranged, for example, in one or more networks, server banks or other arrangements. Computing devices 103 of the computing system 100 may be located in a single installation or may be dispersed among many different geographical locations. As a non-limiting example, one computing device 103 of a computing system 100 may be implemented in a first installation while one or more of the remaining computing devices 103 of the computing system 100 may be implemented in a second installation, with the two installations in data communication with one another. For purposes of convenience, however, the computing devices 103 are depicted in a single installation.

Computing devices 103 within a computing system 100 can generate and/or store hardware usage data that corresponds to the computing resources expended while performing the functions of the computing system 100. As a non-limiting example, the computing devices 103 can maintain and/or populate logs that track hardware utilization data. In this example, the computing devices 103 can monitor processor utilization, memory utilization, disk utilization, network interface utilization, and other hardware utilization metrics that should be appreciated. These metrics can be captured and stored on a real time basis, an hourly basis, a daily basis, upon request, etc. These metrics can also be monitored as a percentage of hardware capacity or an absolute hardware usage measure. Additionally, they can be scaled to a dollar value based on a unit of usage, as the cost of the computing resources expended in the computing devices 103 can be determined by analyzing the cost of the computing devices 103 themselves.

As one non-limiting example, processor usage can be scaled to a dollar value per megahertz of processor usage; memory usage can be scaled to a dollar value per megabyte of memory usage, etc. In other examples, the usage data can be combined and scaled to a single hardware usage metric. As a non-limiting example, processor usage, memory usage, disk usage, etc. can be weighted (or non-weighted) and combined into a single hardware usage metric. Accordingly, a single hardware usage metric can be employed when determining a hardware usage function upon which future hardware usage according to this or other metrics can be predicted.

In some embodiments, certain computing devices 103 within or accessible to the computing system 100 can be tasked with monitoring and/or storing hardware usage data of the entire fleet of computing devices 103 in the system. In the depicted embodiment, a computing device 119 external to the computing system 100 executing a hardware usage monitor 120 application can track and/or store hardware usage data of the computing devices 103 in the computing system 100. It should also be appreciated that the hardware usage monitor 120 can be accessible to the computing system 100 via the network 118 or that the functionality of the hardware usage monitor 120 can be implemented on a computing device 103 within the computing system 100. The specific depiction of FIG. 1 is merely exemplary and other embodiments consistent with this disclosure should be appreciated by a person of ordinary skill in the art.

Accordingly, the hardware usage monitor 120 can analyze historical usage data of the computing system 100 for a specified time period and determine a hardware usage function based at least upon usage factors that are correlated to the historical hardware usage. A historical time period of sufficient size can be chosen to yield an appropriately large sample size for analysis. However, a historical time period that is too large may yield a hardware usage function that is derived from "stale" data, or data that is no longer relevant to current or projected hardware usage. As noted above, various hardware usage factors can be identified and a regression analysis performed to determine whether this analysis yields a hardware usage function having an acceptably low variance compared to historical hardware usage. In one example, historical hardware usage data can be scaled to a single hardware usage metric, and a hardware usage function based on hardware usage factors can be determined that tracks this usage metric. Alternatively, various hardware usage functions can be determined for various hardware usage metrics (e.g., processor usage, memory usage, etc.). For example, a disk usage function can be calculated based upon various usage factors separate from a processor usage function based upon the same or different usage factors, etc.

In addition, whether a hardware usage function has an acceptably low variance relative to historical hardware usage data can be based on a user defined threshold, or the lowest variance of multiple hardware usage functions based upon a variety of permutations of usage factors upon which a regression analysis is performed can be selected.

As noted above, because cumulative factors as well as rate factors can be considered when determining a hardware usage function that is used to project future hardware usage, a regression analysis can be performed on one or more cumulative factors as well as one or more rate factors. In one embodiment, the hardware usage monitor 120 can perform a linear regression analysis on a cumulative factor and a rate factor, which can result in a two factor hardware usage function as follows:

$$HW_{usage} = \alpha * \text{Cumulative} + \beta * \text{Rate} + \gamma \quad \text{Equation 1}$$

The above Equation 1 characterizing a hardware usage function can be determined based upon a regression analysis performed on various permutations of hardware usage factors that include at least one cumulative factor as well as at least one rate factor. It should be appreciated that more than one cumulative factor can be used as well as more than one rate factor, which would result in a hardware usage function having more parameters than is depicted in Equation 1. In other words, in one example, a three factor hardware usage function that takes into account two cumulative factors and one rate factor can be determined. It should be appreciated that a hardware usage function can be based upon any number of factors. In addition, it should also be appreciated that a hardware usage function can be based exclusively on rate factors, exclusively on cumulative factors, or on any combination of rate and cumulative factors.

In the above example of Equation 1, the $\alpha$ coefficient, which is a constant calculated by the regression analysis, represents an amount of hardware usage per unit of a cumulative factor. Likewise, the $\beta$ coefficient represents an amount of hardware usage per unit of a rate factor. The $\gamma$ coefficient represents hardware usage of the computing system if the cumulative and rate factors are zero. In some embodiments, the $\gamma$ coefficient can indicate a degree of error in the hardware usage function's modeling of hardware usage. The $\gamma$ coefficient can also represent overhead factors that affect hardware usage apart from the factors represented by the $\alpha$ coefficient and the $\beta$ coefficient. Accordingly, Equation 1 characterizes a hardware usage metric of the computing system 100 for a given cumulative factor and a given rate factor.

In a non-limiting example of an electronic commerce system implemented by the computing system 100, a hardware usage function can be based at least upon an order rate and a total number of products in the electronic commerce system. An order rate and a total number of products over a given historical time period can be determined from historical data regarding the computing system 100. The hardware usage monitor 120 can extract historical usage data from the computing system 100 for the same historical time period and perform a regression analysis to arrive at a hardware usage function for the historical time period that is based upon the order rate and a total number of products in the electronic commerce system. In this example, if the non-limiting Equation 1 is used, the order rate is the rate factor and the total number of products is the cumulative factor.

Continuing the example of an electronic commerce system, because it should be appreciated that the above two factors can be predictable or projectable by business models, future hardware usage can then be projected by employing the hardware usage function calculated by the hardware usage monitor 120 after performing a regression analysis. As noted above, historical hardware usage data can be scaled to a single hardware usage metric, and a hardware usage function can be calculated on that basis. Therefore, future hardware usage can be projected based upon a given order rate and a given total number of products that are projected to be available in the electronic commerce system.

In other embodiments, rather than employing a single hardware usage metric, various hardware usage functions can be calculated for various specific types of computing resources. As one non-limiting example, future memory usage, can be projected based upon a given order rate and a given total number of products, and future processor usage can also be projected based upon the given order rate and total number products or based upon different metrics if the regression analysis that derives the processor usage function reveals that different usage factors more accurately model processor usage. In one embodiment, the hardware usage monitor 120 can calculate multiple hardware usage functions based upon various permutations of usage factors and can identify a hardware usage function having the lowest variance relative to historical hardware usage data.

In other embodiments, after identification of a hardware usage function having the lowest variance relative to the historical hardware usage data (thereby yielding a hardware usage function that most closely models hardware usage of the computing system 100), the hardware usage monitor 120 can, over time, monitor various usage factors and continue to calculate various hardware usage functions to determine whether a different hardware usage function that more closely models hardware usage emerges. It should be appreciated that, in a computing system 100, the usage factors, particularly cumulative factors, may change drastically over time. As one example, in an electronic commerce system, upon the initial launch of a website implementing an electronic commerce system, there may be fewer total products available in the system and very few users having user profiles, order histories, etc., that must be stored (e.g., cumulative factors) relative to the number of these factors in the system years after its initial launch. Accordingly, these cumulative factors may not play a dominant role in driving hardware usage, or may play little or no role at all, upon the initial launch of the site.

However, over time, as these cumulative factors accumulate in the electronic commerce system, they may start to play a more dominant role in driving hardware usage. Therefore, they may become more important predictors of future hardware usage of the system. Accordingly, the hardware usage monitor 120 can periodically perform regression analyses on the various usage factors that can be tracked to determine if the most accurate hardware usage function changes over time. It should be appreciated that a new hardware usage function that is deemed most accurate as determined by the hardware usage monitor 120 may be dependent on completely different rate factors relative to a previous function. It should also be appreciated that such a new hardware usage function may also be based on the same rate factors, but that the coefficients that weight each rate factor may change over time.

Figure 2:
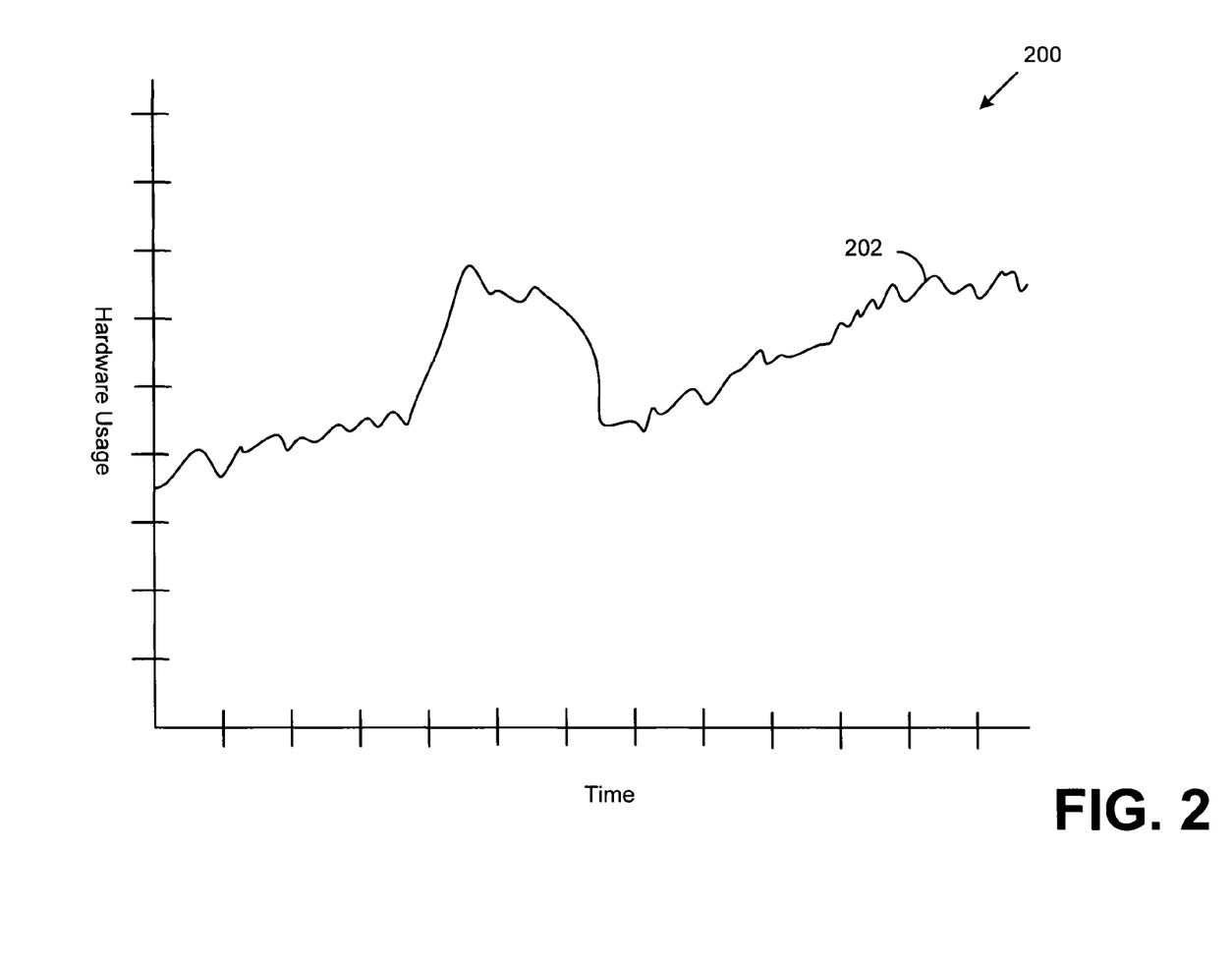
FIG. 2 is a drawing of a hardware usage plot of a computing system of FIG. 1 according to various embodiments of the present disclosure.

Reference is now made to FIG. 2, which depicts a non-limiting exemplary graph 200 plotting historical hardware usage of a computing system 100 over time. The hardware usage plot 202 of an exemplary computing system 100 may grow over time, and may experience various spikes and dips that result from variations in hardware usage due to seasonal considerations (e.g., a busy shopping season) and other factors as can be appreciated.

Figure 3:
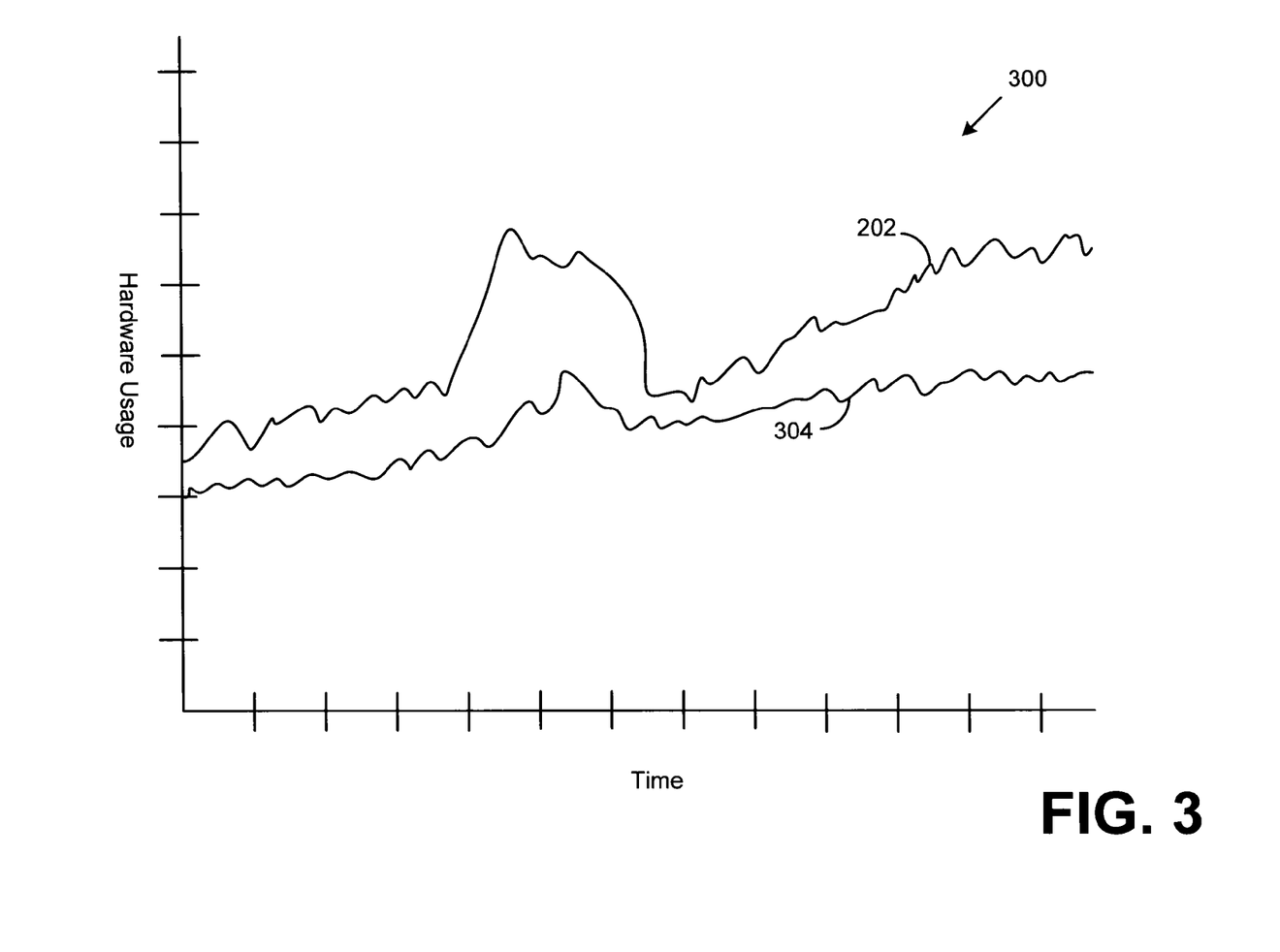
FIG. 3 is a drawing of a hardware usage plot and a plot of a hardware usage function.

With reference to FIG. 3, shown is a non-limiting exemplary graph 300 plotting historical hardware usage of a computing system 100 over time. The predicted usage plot 304 illustrates hardware usage as predicted by a deficient hardware usage function. As shown, usage plot 304, over time, under-predicts hardware usage. As one example, such a deficient hardware usage function in an electronic commerce system may only take into account a rate factor, such as an order rate, but fail to take into consideration cumulative factors.

Figure 4:
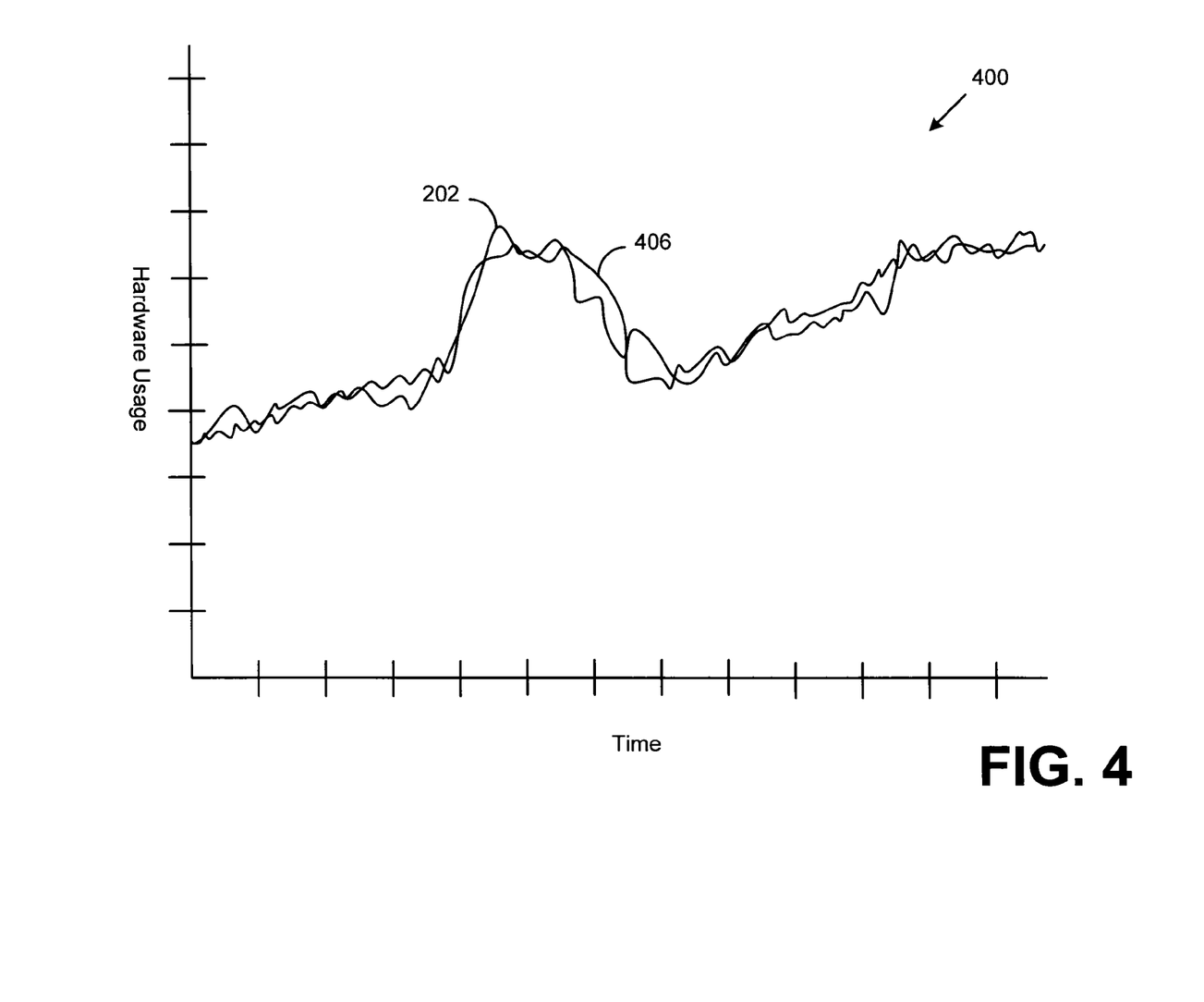
FIG. 4 is a drawing of a hardware usage plot and a plot of a hardware usage function according to various embodiments of the present disclosure.

Accordingly, shown in FIG. 4 is another non-limiting exemplary graph 400 plotting historical hardware usage of a computing system 100 over time. In this example, the predicted usage plot 406 more closely models historical hardware usage relative to the usage plot 304 of FIG. 3. Continuing the previous example of an electronic commerce system, the hardware usage monitor 120 can generate a hardware usage function yielding the predicted usage plot 406 that takes into account appropriate rate factors and cumulative factors. Accordingly, the hardware usage monitor 120 can arrive at a hardware usage function that can more reliably predict future hardware usage and hardware needs that can be based on rate factors and cumulative factors that can be anticipated (e.g., seasonal factors, additional products added to electronic commerce system, etc.).

Figure 5:
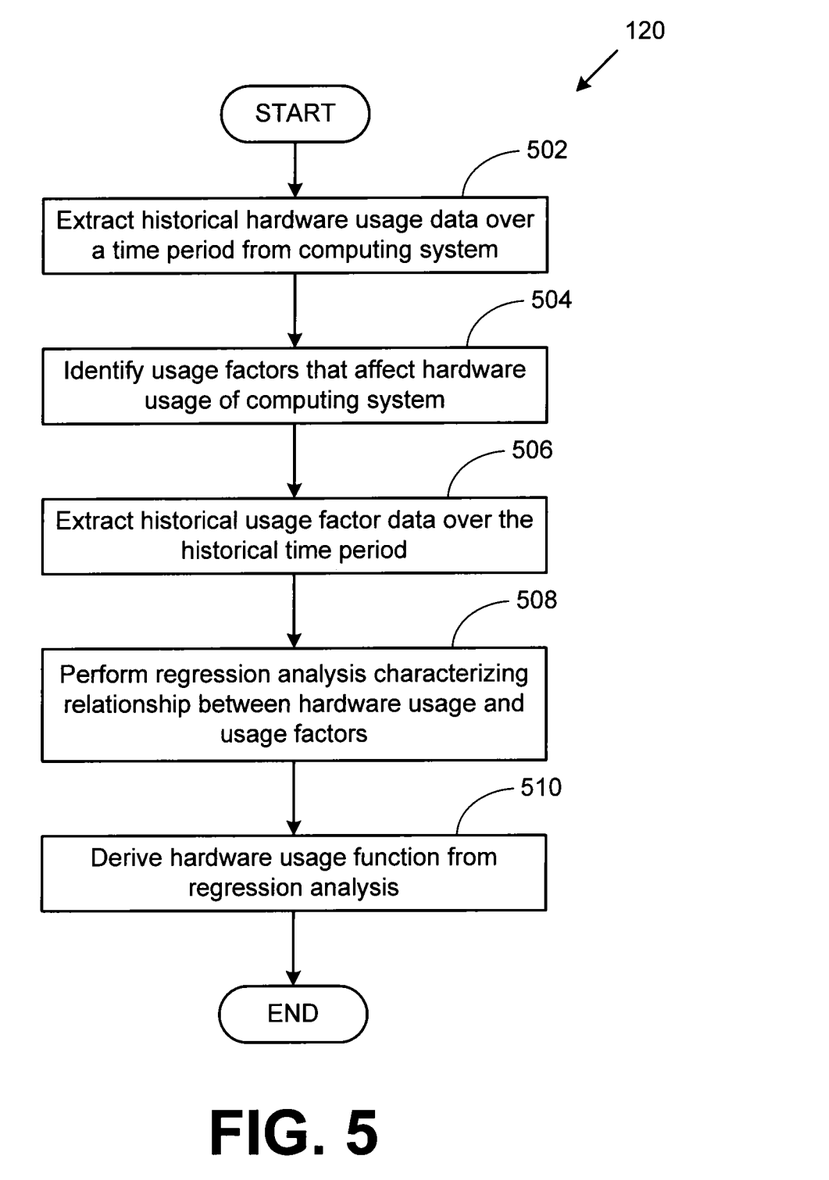
FIG. 5 is a flowchart that illustrates one example of functionality of implemented as a portion of a hardware usage monitor executed in a computing device in the networked environment of FIG. 1 according to various embodiments of the present disclosure.

Referring next to FIG. 5, shown is a flowchart of one example of the functionality of the hardware usage monitor 120 (FIG. 1) application according to one embodiment. Alternatively, the flowchart of FIG. 5 may be viewed as depicting steps of a method implemented in a computing device executing a hardware usage monitor 120 application according to various embodiments. It is understood that the flowchart of FIG. 5 is one example of the operation of the hardware usage monitor 120, where the hardware usage monitor 120 may be implemented in varying ways to accomplish the same functionality.

To begin, in box 502, the hardware usage monitor 120 can extract historical hardware usage data over a time period from the computing system 100 (FIG. 1). In some embodiments, the historical hardware usage data can be extracted by some other method and input into the hardware usage monitor 120 for analyzing. Next, in box 504, the hardware usage monitor 120 can identify usage factors that affect hardware usage of the computing systems. In some embodiments, the usage factors can be identified by a user, who can direct the hardware usage monitor 120 to analyze the usage factor data. In box 506, usage factor data regarding the usage factors can be extracted from the computing system 100.

Thereafter, in box 508, the hardware usage monitor 120 can perform a regression analysis on the usage factor data to arrive at a hardware usage function that characterizes hardware usage. In box 510, a hardware usage function is derived from the regression analysis that can be used to model future hardware usage.

Figure 6:
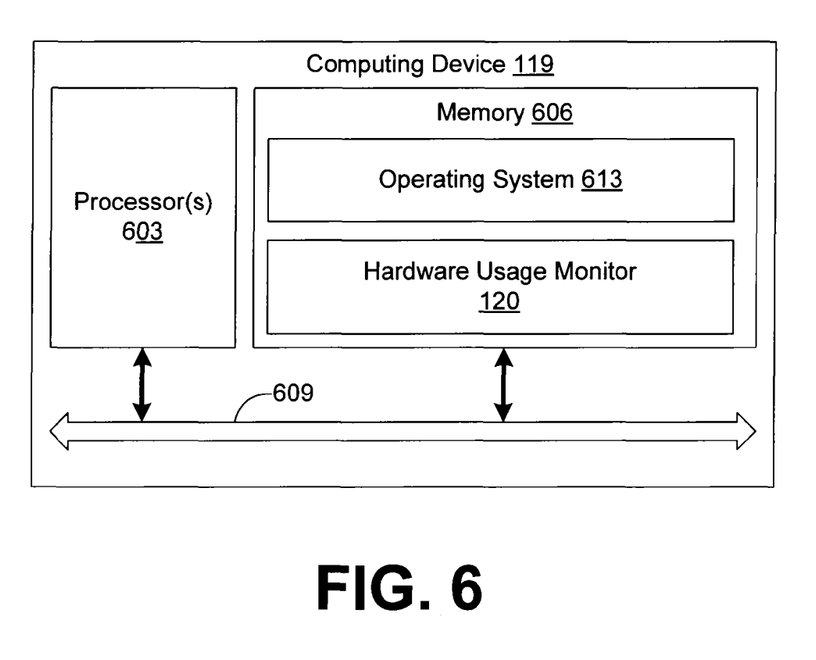
FIG. 6 is a schematic block diagram that provides one example illustration of a computing device executing a hardware usage monitor employed in the networked environment of FIG. 1 according to various embodiments of the present disclosure.

Referring next to FIG. 6, shown is a schematic block diagram of one example of the computing device 105 according to an embodiment of the present disclosure. The computing device 119 includes at least one processor circuit, for example, having a processor 603 and a memory 606, both of which are coupled to a local interface 609. To this end, the computing device 119 may comprise, for example, a server computer or like device. The local interface 609 may comprise, for example, a data bus with an accompanying address/control bus or other bus structure as can be appreciated.

Stored in the memory 606 are several components and/or applications that are executable by the processor 603. In particular, stored in the memory 606 and executable by the processor 603 are an operating system 613, the hardware usage monitor 120, and potentially other applications such as an electronic commerce application, search engine application, etc.

A number of software components are stored in the memory 606 and are executable or executed by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 603 may represent multiple processors and the memory 606 may represent multiple memories that operate in parallel. In such a case, the local interface 609 may be an appropriate network that facilitates communication between any two of the multiple processors, between any processor and any one of the memories, or between any two of the memories etc. The local interface 609 may comprise additional systems designed to coordinate this communication, including, for example, performing load balancing. The processor 603 may be of electrical or of some other available construction.

The various applications or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as the hardware usage monitor 120 described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of the various applications and/or other components such as the hardware usage monitor 120 as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications and/or other components described herein such as the hardware usage monitor 120 comprise software or code, each can be embodied in any computer-readable medium for use by or in connection with an instruction execution system such as, for example, a processor in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for projecting hardware usage in a computing system, comprising the steps of:
    extracting historical hardware usage data in a computing device from the computing system, the hardware usage data characterizing hardware usage of the computing system over an historical time period;
    identifying a plurality of usage factors affecting hardware usage of the computing system, the plurality of usage factors comprising at least one rate factor corresponding to a rate at which operations in the computing system occur over a unit of time, and a cumulative factor corresponding to an amount of data storage consumed by the computing system;
    extracting historical usage factor data corresponding to at least one usage factor in the computing device from the computing system, the usage factor data characterizing occurrences of the at least one usage factor over the historical time period; and
    performing at least one regression analysis on the historical usage factor data in the computing device, the regression analysis determining a first hardware usage function characterizing a relationship between the at least one usage factor and the historical hardware usage data.

2. The method of claim 1, further comprising the step of projecting future hardware usage based at least upon the first hardware usage function.

3. The method of claim 1, wherein the step of performing at least one regression analysis further comprises:

performing a plurality of regression analyses in the computing device on a plurality of historical usage factor data, the plurality of historical usage factor data comprising a plurality of data sets corresponding to a plurality of permutations of usage factors;

identifying a first permutation of usage factors in the computing device yielding a hardware usage function having the lowest variance from the historical hardware usage data; and associating the hardware usage function having the lowest variance from the historical hardware usage data with a first time period.

4. The method of claim 3, further comprising the steps of:

performing a plurality of regression analyses and identifying a second permutation of usage factors yielding a hardware usage function having the lowest variance from the historical hardware usage data in a second time period;

determining a second hardware usage function having the lowest variance from the historical hardware usage data; and associating the second hardware usage function with the second time period.

5. The method of claim 1, wherein the content requests further comprise at least one of: an order, a transaction, a page view, or network bandwidth consumption.

6. The method of claim 1, wherein the computing system further comprises an electronic commerce system and the total amount of data stored in the computing system further comprises at least one of: products, orders, customers, product data, or customer data.

7. The method of claim 1, wherein the first hardware usage function further comprises:

$$HW_{usage} = \alpha * Cumulative + \beta * Rate + \gamma;$$

wherein $HW_{usage}$ comprises a total hardware usage metric, $\alpha$ comprises a first hardware usage metric per unit of the cumulative factor, $\beta$ comprises a second hardware usage metric per unit of the rate factor, and $\gamma$ comprises a baseline hardware usage metric if the cumulative factor and rate factor are zero.

8. The method of claim 1, wherein the computing system further comprises a system selected from the group consisting of a content delivery system, a search system and a data repository.

9. A system, comprising:

at least one computing device; and a hardware usage monitor application executable in the at least one computing device, the hardware usage monitor application comprising:

logic that selects at least one rate factor and at least one cumulative factor affecting the hardware usage of a computing system, the at least one rate factor related to a rate at which content requests to the computing system occur over a time unit, and the cumulative factor related to an amount of data storage consumed by the computing system;

logic that performs at least one regression analysis on usage factor data regarding the at least one rate factor and at least one cumulative factor over a first time period, the regression analysis determining a relationship between the at least one rate factor, the at least one cumulative factor, and hardware usage data over the first time period; and logic that generates at least one hardware usage function characterizing the relationship.

10. The system of claim 9, wherein the hardware usage monitor further comprises logic that projects future hardware usage based at least upon the first hardware usage function.

11. The system of claim 9, wherein the logic that selects at least one rate factor and at least one cumulative factor further comprises logic that selects a plurality of rate factors and a plurality of cumulative factors; and the logic that performs at least one regression analysis further comprises logic that performs a plurality of regression analyses on permutations of the rate factors and the cumulative factors.

12. The system of claim 11, wherein the logic that generates at least one hardware usage function further comprises logic that selects a first hardware usage function having the lowest variance relative to hardware usage data over the first time period.

13. The system of claim 12, wherein the logic that performs at least one regression analysis further comprises logic that performs a plurality of regression analyses on permutations of the rate factors and the cumulative factors over a second time period.

14. The system of claim 13, further comprising:

logic that selects a second hardware usage function having the lowest variance relative to hardware usage data over the second time period; and logic that generates an alert if the first hardware usage function is different from the second hardware usage function.

15. The system of claim 9, wherein the hardware usage function further comprises:

$$HW_{usage} = \alpha * Cumulative + \beta * Rate + \gamma;$$

wherein $HW_{usage}$ comprises a total hardware usage metric, $\alpha$ comprises a first hardware usage metric per unit of the at least one cumulative factor, $\beta$ comprises a second hardware usage metric per unit of the at least one rate factor, and $\gamma$ comprises a baseline hardware usage metric if the at least one cumulative factor and at least one rate factor are zero.

16. The system of claim 9, wherein the computing system further comprises a system selected from the group consisting of a content delivery system, a search system and a data repository.

17. A computer readable medium including a hardware usage monitor application executable by at least one computing device, the hardware usage monitor application comprising:

logic that extracts historical hardware usage data from the computing system, the hardware usage data characterizing hardware usage of the computing system over an historical time period;

logic that identifies a plurality of usage factors affecting hardware usage of the computing system, the plurality of data storage consumed by the computing system;

logic that extracts historical usage factor data corresponding to at least one usage factor from the computing system, the usage factor data characterizing occurrences of the at least one usage factor over the historical time period;

logic that performs at least one regression analysis on the historical usage factor data, the regression analysis determining a hardware usage function characterizing a relationship between the at least one usage factor and the historical hardware usage data; and logic that calculates a variance of the hardware usage function relative to a plot of the historical usage data over a time period.

18. The computer readable medium of claim 17, further comprising logic that projects future hardware usage based at least upon the first hardware usage function.

* * * * *

UNITED STATES PATENT AND TRADEMARK OFFICE
CERTIFICATE OF CORRECTION

PATENT NO.        : 8,417,811 B1                                            Page 1 of 1
APPLICATION NO.   : 12/640331
DATED             : April 9, 2013
INVENTOR(S)       : Jonathan A. Jenkins and Timothy M. Sehn It is certified that error appears in the above-identified patent and that said Letters Patent is hereby corrected as shown below:

In the Claims

Claim 17, column 12, line 54: Before the word "data" add --usage factors comprising at least one rate factor related to a rate at which content requests to the computing system occur over a time unit and the cumulative factor comprising an amount of--.

Signed and Sealed this
Twenty-sixth Day of August, 2014

Michelle K. Lee
*Deputy Director of the United States Patent and Trademark Office*